May 24, 1966 F. JAKOB ET AL 3,252,394
FLASH DEVICE FOR CAMERAS
Filed Feb. 11, 1964

INVENTORS
FRANZ JAKOB
KARL WAGNER
BY
Michael S. Striker
Attorney

United States Patent Office 3,252,394
Patented May 24, 1966

3,252,394
FLASH DEVICE FOR CAMERAS
Franz Jakob, Unterhaching, Munich, and Karl Wagner,
Munich, Germany, assignors to Agfa Aktiengesellschaft,
Leverkusen, Germany
Filed Feb. 11, 1964, Ser. No. 344,037
Claims priority, application Germany, Feb. 13, 1963,
A 19,520
10 Claims. (Cl. 95—11)

The present invention relates to flash devices for cameras.

In particular, the present invention relates to that type of flash device where a capacitor is included in a charging circuit which includes an interrupter switch which is required to be closed when the flash device is mounted on a camera.

In known flash devices of the above type a control member for closing and opening this interrupter switch extends freely at the exterior of the housing of the flash device. This switch control member is of course actuated to close the switch when the flash device is mounted on a camera. However, when the flash device is carried about, particularly with additional devices in a pocket, for example, it is possible for the switch controlling member to be undesirably actuated so as to close the circuit and maintain it constantly closed when the device is being carried about and is not in use, and as a result undesirable discharge of the battery will occur.

It is accordingly a primary object of the present invention to provide a structure of the above type which cannot accidentally be placed in a position where its circuit is undesirably closed, as when the device is being carried about in a pocket, for example.

It is furthermore an object of the present invention to provde a structure of the above type where the switch which controls the circuit will be automatically closed whenever the flash device is mounted on a camera.

Furthermore it is an object of the present invention to provide a structure of the above type which is exceedingly simple and inexpensive and which will operate reliably while at the same time providing complete protection for the switch-operating structure.

With these objects in view the invention includes, in a flash device for a camera, a housing which has a portion which is adapted to be connected with a mounting structure of a camera, this portion of the housing being formed at its exterior with a cutout which receives part of the mounting structure of the camera when the flash device is mouted thereon, and within this housing is situated a normally open switch which is required to be closed when the flash device is mounted on the camera. In accordance with the present invention a switch-actuating means is movably carried by the housing of the flash device for movement between a switch-opening position where the normally open switch remains open and a switch-closing position where the switch-actuating means closes this switch, and the switch-actuating means of the invention has a free end portion which extends into this cutout to engage the part of the mounting structure received therein and to be displaced by this part of the mounting structure, when the flash device is mounted on the camera, for shifting the switch-actuating means from its switch-opening position to its switch-closing position, so that in this way the switch will be automatically closed whenever the flash device is mounted on the camera. Because the free end portion of the switch-actuating means extends into the cutout, without extending upwardly beyond the latter, it is not possible to accidentally actuate the switch-actuating means as when the device is carried about in a pocket, and thus the normally open switch will remain reliably open except when the structure of the invention is mounted on a camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows in addition the normally open interrupter switch and the switch-actuating means of the invention which controls this switch;

Figure 1:
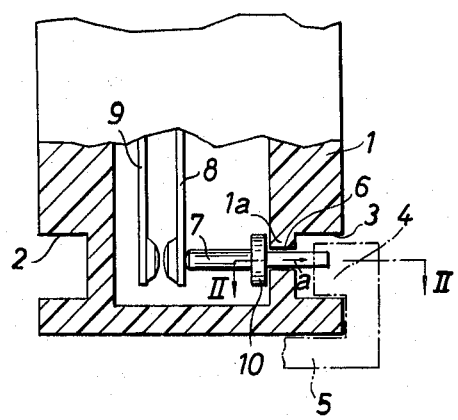
FIG. 1 is a fragmentary sectional elevation showing the lower, foot portion of the housing of a flash device and part of a mounting shoe cooperating therewith, this shoe being fragmentarily illustrated in dot-dash lines.

In the example of the invention which is illustrated in the drawings, the lower portion of the housing 1 of the flash device is in the form of a foot which is adapted to be mounted in the shoe which is carried in a conventional way by the camera. This lower portion 1 of the housing is formed at its exterior with a pair of cutouts 2 and 3 in the form of elongated parallel grooves, and the shoe 5 which is carried in a known way by the camera has a pair of upper, inwardly directed flanges 4 which are received in the grooves 2 and 3, in a manner well known in the art, so as to reliably retain the flash device mounted on the camera. Thus, it will be seen that the housing 1 is formed with a cutout 3 for receiving a part 4 of a mounting structure 5 of the camera whenever the flash device is mounted thereon.

The wall portion 1a of the housing 1 which remains after the groove 3 is formed therein is itself formed with an elongated opening 6 passing therethrough, and this opening 6 serves to enable the housing 1 to support a switch-actuating means 7 for movement between a switch-opening position and a switch-closing position, the switch-actuating means in an illustrated example being in the form of an elongated member capable of being longitudinally shifted between the switch-opening position illustrated in FIG. 1 and a switch-closing position displaced to the left from the position shown in FIG. 1. The switch-actuating means 7 has a free end portion 7a which extends into the cutout 3, and it will be noted particularly from FIG. 2 that this portion 7a cannot extend outwardly beyond the cutout so that it never projects from the housing 1 and therefore cannot be accidentally actuated.

Within the housing 1 there is located a charging circuit for a capacitor, this circuit also including the source of current, and in this circuit is arranged the interrupter switch 8, 9 which is normally open and which includes the elongated springy switch members 8 and 9 shown in FIG. 1, these members by their resiliency assuming the open position shown in FIG. 1. When the flash device is mounted on the camera it is required that the interrupter switch 8, 9 be closed so that the circuit will be in a position ready for providing flash operation of the camera. It will be noted that the left end of the switch-actuating means 7 engages the springy switch member 8. This member 8 will by its own resiliency assume an open position and it urges the switch-actuating means 7 to the illustrated switch-opening position where a collar 10 fixedly carried by the switch-actuating means 7 engages the inner surface of the housing 1. The springy contact 8 urges the member 7 in the direction of the arrow $a$ of FIG. 2.

Figure 2:
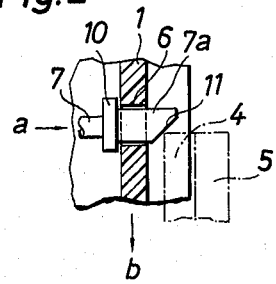
FIG. 2 is a fragmentary sectional plan view taken on line II—II of FIG. 1 in the direction of the arrows.

The free end portion 7a of the switch-actuating means 7 has a substantially rectangular configuration in crosssection, and the opening 6 has a similar rectangular configuration, so that in this way the switch-actuating means 7 cannot rotate and can only shift longitudinally, and when the housing 1 is mounted on the camera it is moved in the direction of the arrow $b$ of FIG. 2 with respect to the mounting structure 5. The free end portion 7a is provided with an inclined surface portion 11 which is inclined with respect to the direction $b$ and which engages the flange 4 so that during shifting of the housing 1 along the shoe 5 for mounting the flash device on the camera the flange 4 will cooperate with the surface 11 for advancing the switch-actuating means 7 to the left, as viewed in FIGS. 1 and 2, so as to automatically displace the switch member 8 in opposition to its own resiliency to a position engaging the switch contact 9, and thus the switch will be automatically closed whenever the flash device is mounted on the camera. It is also possible to provide the flange 4 with an inclined surface extending in the same direction and inclined in the same way as the surface 11.

Thus, when the flash device is mounted on a camera the flanges 4 of the shoe 5 are received in the grooves 2 and 3 and the surface 11 engages the flange 4 shown in the drawings so that the switch-actuating means 7 is shifted in a direction opposite to that indicated by the arrow $a$ in FIG. 2, and thus the switch 8, 9 is closed and the circuit within the housing 1 is also closed, this circuit remaining closed until the flash device is removed from the camera so that the contact 8 can again resume the position thereof shown in FIG. 1.

As was indicated above, because the free end portion 7a of the switch-actuating means 7 is entirely housed at all times within the groove 3, unintentional closing of the circuit is reliably avoided.

Of course, the invention is not limited to the details described above. Thus, instead of a longitudinally shiftable switch-actuating means 7, it is possible to use a two-armed lever one end of which extends into the groove 3 and the other end of which engages the switch member 8. Moreover, it is possible to make the switch-actuating means 7 integral with the member 8 or to fix it rigidly thereto.

Figure 3:
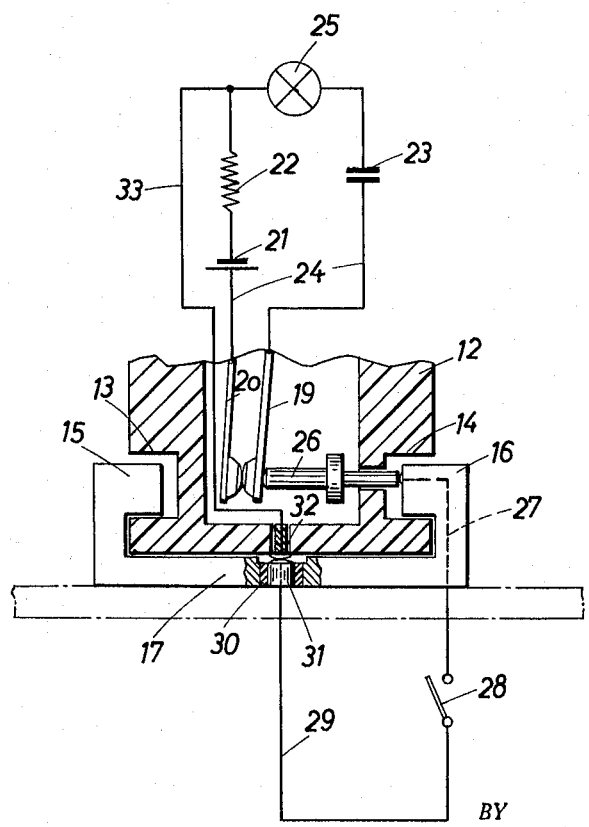
FIG. 3 is a fragmentary sectional elevation of the lower, foot portion of the housing of another flash device and a mounting shoe with a schematic circuit diagram.

With flash devices which are not actuated by a cable and which have for example a central contact by which the flash apparatus is connected electrically with the camera, the switch-actuating means can also be used to provide such electrical connection of such a flash device with the camera, as illustrated in FIG. 3. With such construction when the flash device is mounted on the camera the switch-actuating means will not only close and interrupt the switch as described above but will also form an electrical connection between the flash device and the camera. With flash devices which have prong and plug connections with a camera, it is possible to also practice the invention, but in this case one of the prongs can form the switch-actuating means and can be guided in a suitable sleeve so as to close the switch when the device is mounted on the camera.

As was mentioned above, where the flash device operates without a cable, a particularly simple construction can be provided since the switch-actuating means can itself engage the contact which is carried by the camera so as to form the electrical connection between the flash device and the camera.

Also, as was mentioned above, the interrupter switch is preferably situated in an electrical circuit which includes not only the source of current but also a capacitor, so that the switch is located in the charging circuit for the capacitor.

Thus, referring to FIG. 3, the housing 12 of the flash device illustrated therein has a lower foot portion provided with cutouts formed by the elongated grooves 13 and 14 which receive the inwardly projecting elongated portions 15 and 16 of the shoe 17 of the unillustrated camera when the foot of the housing 12 is inserted in the shoe to assume the position shown in FIG. 3.

Within the housing 12 are the contacts 19 and 20 of the interrupter switch of this embodiment, and these are elongated springy contact members as described above in connection with FIG. 1. The contacts 19 and 20 are located in a charging circuit 24 which includes the battery 21, the charging resistor 22, and a capacitor 23. This circuit can be closed when the flash lamp 25 is inserted into the socket provided therefor. The embodiment of FIG. 3 includes a switch-actuating means 26 which may be identical with the above-described switch-actuating means 7, and when the housing 12 is mounted in the shoe 17 the flange 16 of the shoe will displace the switch-actuating means 26 to the position illustrated in FIG. 3 where the interrupter switch 19, 20 is closed, so that the charging circuit 24 closes and thus the capacitor 23 is charged. Because of the presence of the charging resistor 22 in the circuit there will be no ignition of the flash lamp 25 at this time.

In the embodiment of FIG. 3, the switch-actuating means 26 is electrically conductive and, when the flash assembly is mounted on the shoe, connects the contact spring 19 with the conductor 27 so that through element 26 elements 19 and 27 are placed in electrical connection with each other. The conductor 27 is carried by the camera and leads to a known synchronizer switch 28 which is controlled in a well known manner by the camera shutter. The switch 28 is connected by a conductor 29 in the camera to a contact member 31 situated within and surrounded by an insulating sleeve 30 in the mounting shoe 17. The housing 12 carries at the bottom of its foot portion a contact 32, which is the central contact referred to above, and this contact 32 engages the contact 31 when the flash apparatus is mounted on the camera. The contact 32 is connected to the charging circuit 24, in the manner illustrated in FIG. 3, by the conductor 33. It will be noted that the contact 33 is connected to a point of the circuit 24 which is situated between the resistor 22 and the lamp 25.

When, after the capacitor 23 is charged, the synchronizer switch 28 is closed upon release of the shutter, the capacitor 23 can discharge through the spring 19, the switch actuating means 26, the conductors 27, 29, and 33, thus igniting the lamp 25.

It will be understood that each of the elements described above, or two or more together, may also find a useful application in other types of flash devices differing from the types described above.

While the invention has been illustrated and described as embodied in flash devices for cameras, it is not intended to be limited to the details shown, since various apparatus modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a flash device for cameras, in combination, a hollow housing carrying in its interior a switch which is required to be closed when the housing is mounted on a camera, said housing having a wall portion formed with a cutout at the exterior of said housing and said cutout being adapted to receive at least part of a mounting structure carried by the camera for mounting the flash device thereon; and switch-actuating means movably carried by said housing for movement between a switch-closing position closing said switch and a switch-open position opening said switch, said switch-actuating means having a free end portion extending into said cutout to be engaged by said part of said mounting structure when the flash device is mounted on the camera and to be displaced by said part of said mounting structure from said switch-opening position to said switch-closing position, whereby the switch in said housing is automatically closed when the flash device is mounted on a camera.

2. In a flash device for cameras, in combination, a hollow housing carrying in its interior a switch which is required to be closed when the housing is mounted on a camera, said housing having a wall portion formed with a cutout at the exterior of said housing and said cutout being adapted to receive at least part of a mounting structure carried by the camera for mounting the flash device thereon; and switch-actuating means movably carried by said housing for movement between a switch-closing position closing said switch and a switch-open position opening said switch, said switch-actuating means having a free end portion extending into said cutout to be engaged by said part of said mounting structure when the flash device is mounted on the camera and to be displaced by said part of said mounting structure from said switch-opening position to said switch-closing position, whereby the switch in said housing is automatically closed when the flash device is mounted on a camera, the portion of said switch-actuating means which extends into said cutout being situated enterly within said cutout so that said switch-actuating means does not project beyond said cutout even when the flash device is not mounted on a camera, so that the switch will not be accidentally closed.

3. In a flash device for cameras, in combination, a hollow housing having a lower portion adapted to be mounted on a camera, said lower portion being formed with a pair of opposed elongated grooves adaped to receive a pair of flanges of a mounting shoe carried by a camera to be supported by the mounting shoe on a camera, said housing having in its interior a switch which is required to be closed when the flash device is mounted on a camera; and switch-actuating means movably carried by said housing for movement between a switch-opening position where said switch is open and a switch-closing position where said switch is closed, said switch-actuating means having a free end portion extending into one of said grooves to be engaged by part of the camera shoe and displaced by said part from said switch-opening position to said switch-closing position so that the switch will be automatically closed when the flash device is mounted on a camera.

4. In a flash device for cameras, in combination, a hollow housing having a portion adapted to be directly connected with a mounting structure of a camera when the flash device is mounted on a camera, said portion of said housing being formed at its exterior with a cutout which receives a part of the mounting structure, and said housing carrying in its interior an interrupter switch which is required to be closed when the flash device is mounted on a camera, said switch being located at least in part in alignment with said cutout; and an elongated switch-actuating means supported for longitudinal shiftable movement by said housing between a switch-opening position and a switch-closing position, said switch-actuating means having a free end portion extending into said cutout to be engaged and displaced by said part of said mounting structure when the flash device is mounted on the camera, and when engaging said part of said mounting structure said switch-actuating means being longitudinally displaced from its switch-opening position to its switch-closing position, so that the switch is automatically closed when the flash device is mounted on the camera the portion of said switch-actuating means which extends into said cutout being situated entirely within said cutout so that said switch-actuating means does not project beyond said cutout even when the flash device is not mounted on a camera, so that the switch will not be accidentally closed.

5. In a flash device for cameras, in combination, a hollow housing having a portion adapted to be connected directly with a mounting structure of a camera when the flash device is mounted on a camera, said portion being formed with a cutout which receives part of the mounting structure and said housing having in its interior a switch means which resiliently assumes an open position unless acted upon by an outside force; and switch-actuating means movably carried by said housing for moving between a switch-opening position where said switch means remains open and a switch-closing position where said switch-actuating means closes said switch in opposition to the resilient force of said switch means, said switch-actuating means having a free end portion extending into said cutout to engage said part of said mounting structure and to be displaced by the latter for displacing said switch-actuating means to said switch-closing position for automatically closing the switch when the flash device is mounted on a camera.

6. In a device as received in claim 5, said switch means including an elongated springy contact member which resiliently assumes a position displaced from a second contact member of said switch means.

7. In a flash device for cameras, in combination, a housing having a portion adapted to be directly connected with a mounting structure of a camera when the flash device is mounted on the camera, said portion of said housing being formed with a cutout at the exterior of said housing and said cutout receiving part of a mounting structure of the camera when said flash device is mounted thereon, said portion of said housing being moved in a predetermined direction with respect to the mounting structure to have the part of the latter received in said cutout during mounting of the flash device on the camera, and said housing having in its interior an interrupter switch which is normally open and which is required to be closed when the flash device is mounted on the camera; and switch-actuating means movably carried by said housing for moving between a switch-opening position where said switch is open and a switch-closing position where said switch-actuating means engages and closes said switch, said switch-actuating means having a free end portion extending into said cutout to engage said part of said mounting structure when the flash device is mounted on the camera and to be displaced by said part of said mounting structure from said switch-opening to said switch-closing position so that the switch will be automatically closed when the flash device is mounted on a camera, said free end portion of said switch-actuating means having an outer surface portion inclined with respect to said predetermined direction and engaging said part of said mounting structure to displace said switch-actuating means from said switch-opening to said switch-closing position thereof during movement of said portion of said housing in said predetermined direction when the flash device is mounted on a camera.

8. In a flash device for cameras, in combination, a housing adapted to be mounted on a camera and having in its interior a switch which is to be electrically connected with the camera, said housing having at its exterior a cutout which receives part of a mounting structure carried by the camera for mounting the flash device thereon, and switch-actuating means including an electrically conductive portion movably carried by said housing for movement between a switch-opening position where the switch is open and a switch-closing position where the switch is closed and for simultaneously placing said switch in electrical connection with the camera when said electrically conductive portion of switch-actuating means is displaced from said switch-opening to said switch-closing position, said switch-actuating means having a free end portion located in said cutout and engaging said part of said mounting structure when the flash device is mounted on the camera to be displaced by said part of said mounting structure so as to automatically place said switch in electrical connection with the camera during mounting of the flash device thereon.

9. In a flash device for cameras, in combination, a housing having in its interior an interrupter switch forming part of an electrical circuit which includes a source of current and a capacitor, said housing having a portion adapted to be connected directly with a mounting structure carried by the camera and said portion being formed with a cutout which receives part of the mounting structure of the camera; and switch-actuating means movably carried by said housing for movement between a switch-opening position where the switch is open and a switch-closing position where the switch is closed, said switch-actuating means having a free end portion extending into said cutout to engage said part of said mounting structure and to be displaced thereby, when the flash device is mounted on the camera, from said switch-opening position to said switch-closing position for automatically closing said switch when the device is mounted on the camera.

10. In a flash gun arrangement, in combination, a camera housing having first attaching means; a flash gun attachment having second attaching means and adapted to be located in an inoperative position wherein said second attaching means on said flash gun attachment engage said first attaching means on said camera housing; flash bulb means in said flash gun attachment; a charging circuit in said flash gun attachment connected to said flash bulb means and including switch means having two terminals being spaced from each other when said flash gun attachment is in operative position and adapted to be moved into contact with each other to thereby close said charging circuit for charging the same; combined switch operating and first electrical contact means mounted on said camera housing and moving said terminals of said switch means into contact with each other to close said charging circuit when said flash gun attachment is in operative position and simultaneously connecting said first electrical contact means with said charging circuit; second electrical contact means mounted on said camera housing; third electrical contact means mounted on said flash gun attachment adapted to contact said second electrical contact means which said flash gun attachment is in operative position; an electrical discharge circuit located partly in said flash gun attachment connected to said charging circuit and partly in said camera housing and including said first, second and third electrical contact means connected in series therein; and a discharge switch in said electrical discharge circuit in series with said electrical contact means for discharging said charging circuit and thereby actuating said flash bulb.

References Cited by the Examiner
UNITED STATES PATENTS

| | | | |
|---|---|---|---|
| 2,892,073 | 6/1959 | Michatek | 240—1.3 |
| 3,077,534 | 2/1963 | Brandt | 240—1.3 |

JOHN M. HORAN, *Primary Examiner.*